US012614003B2

(12) United States Patent
Dolgunov et al.

(10) Patent No.: US 12,614,003 B2
(45) Date of Patent: Apr. 28, 2026

(54) DISTRIBUTED SYSTEM ON A CHIP MEMORY ACCESS CONTROL

(71) Applicant: Intel Corporation, Santa Clara, CA (US)

(72) Inventors: Boris Dolgunov, San Jose, CA (US); Maulik L. Dhada, Hillsboro, OR (US); William John Bainbridge, Palo Alto, CA (US); Siva Bhanu Krishna Boga, Folsom, CA (US); Ruben Daniel Varela Velasco, Portland, OR (US); David Deitcher, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 798 days.

(21) Appl. No.: 17/844,383

(22) Filed: Jun. 20, 2022

(65) Prior Publication Data

US 2023/0409759 A1 Dec. 21, 2023

(51) Int. Cl.
| | |
|---|---|
| *G06F 21/78* | (2013.01) |
| *G06F 21/31* | (2013.01) |
| *G06F 21/57* | (2013.01) |
| *G06F 21/60* | (2013.01) |

(52) U.S. Cl.
CPC .............. *G06F 21/78* (2013.01); *G06F 21/31* (2013.01); *G06F 21/575* (2013.01); *G06F 21/604* (2013.01)

(58) Field of Classification Search
CPC ........ G06F 21/78; G06F 21/31; G06F 21/575; G06F 21/604
See application file for complete search history.

(56) References Cited

U.S. PATENT DOCUMENTS

| | | | | |
|---|---|---|---|---|
| 2004/0003262 A1* | 1/2004 | England | .............. | G06F 12/1408 |
| | | | | 713/189 |
| 2008/0278285 A1* | 11/2008 | Matsushima | .... | G11B 20/00695 |
| | | | | 340/5.74 |
| 2017/0097896 A1* | 4/2017 | Molnar | ................. | G06F 12/145 |
| 2019/0370439 A1* | 12/2019 | Lin | ..................... | G06F 12/0284 |
| 2021/0232510 A1* | 7/2021 | Ndu | ...................... | G06F 9/4401 |

OTHER PUBLICATIONS

Intel® Virtualization Technology for Directed I/O (VT-D), Intel® Virtualization Technology for Directed I/O Specification, Revision 4.0, Jun. 2022, 328 pgs.
U.S. Appl. No. 17/304,834, filed Jun. 25, 2021, entitled "Apparatus, System, and Method for Secure Memory Access Control," by Siva Bhanu Krishna Boga et al.

* cited by examiner

*Primary Examiner* — Amie C. Lin
(74) *Attorney, Agent, or Firm* — NICHOLSON DE VOS WEBSTER & ELLIOTT LLP

(57) ABSTRACT

Embodiments described herein may include apparatus, systems, techniques, or processes that are directed to access control mechanisms used to protect isolated memory regions. Embodiments described herein enable a distributed and efficient register structure enabling system providers to reduce cost and improve system performance while preventing malicious devices from accessing isolated memory regions. Isolated memory region access control registers are distributed through multiple access points or bridges but each may be optimized and minimized to allow fast and efficient access control. Other embodiments may be described and/or claimed.

20 Claims, 8 Drawing Sheets

| 200 |
|---|
| 210 — BASE Register |
| 220 — Mask/Limit Register |
| 230 — RAC Register |
| 240 — WAC Register |
| 250 — CP Register |

| 300 |
|---|
| 310 — BASE Register |
| 320 — Mask/Limit Register |

500

510 — Receive a memory transaction request

520 — Is memory transaction directed to an IMR ?

No

Yes

540 — Does bridge table have a complete IMR register for the isolated memory region ?

No

Yes

560 — Does requesting device have appropriate read/write/cp access ?

No

Yes

530 — Do not reject memory transaction

550 — Reject memory transaction

600

DISTRIBUTED SYSTEM ON A CHIP MEMORY ACCESS CONTROL

TECHNICAL FIELD

Embodiments of the present disclosure generally relate to the field of computing, in particular, to memory access control in a system on a chip (SoC).

BACKGROUND

Computing systems can have many devices accessing a shared memory including central processing units (CPUs), graphics processing units (GPUs), input/output (IO) devices and the like. Device access to memory is often implemented using multi-layered memory access control mechanisms. Access to memory is typically protected using memory management units (MMUs) and/or IO memory management units (IOMMUs). Many devices may use isolated memory regions (IMRs), also referred to as stolen or protected memory regions. IMRs are typically used to store data that needs to be protected, for example, for set up and configuration data and the like. Special hardware is typically used to protect the isolated memory regions and is typically handled by the memory protection units (MPUs) coupled to or part of the MMUs. Each MPU needs to know where the isolated memory regions are located, which devices have access to the region, and the access permissions of the device (read, write, and the like). This information is typically stored in registers in MPU local memory or designed into the MPU hardware. As computer systems become more complex, including many devices and access points, implementations to protect these isolated memory regions can become costly due to an increased number of protected memory regions, increased power usage, increased gate count, and the overhead of configuring and maintaining access control rights. Implementing a destination side access control mechanism (that is, near the memory interface) is not practical because performing access control in parallel to address decoding decreases bandwidth and increases latency.

A solution is needed to provide efficient memory access control for stolen memory regions that reduces cost and does not reduce bandwidth or increase latency.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
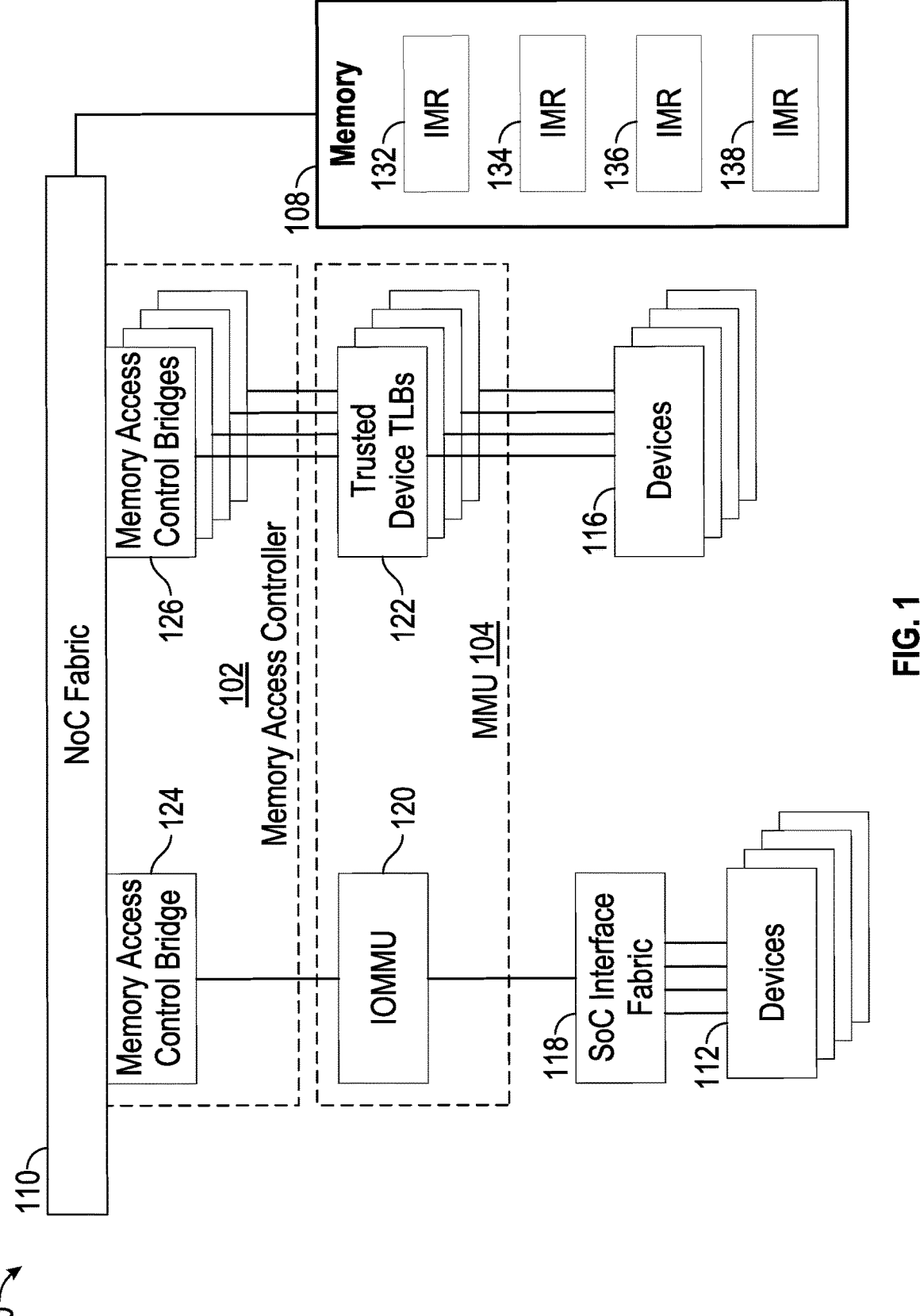
FIG. 1 illustrates a computing system according to various embodiments.

Embodiments described herein may include apparatus, systems, techniques, and/or processes that are directed to access control mechanisms used to protect isolated memory regions. In legacy implementations, traditional methods of handling memory access control are costly and disadvantageous as computer systems continue to increase the number of devices accessing memory, access points, and number of isolated memory regions. Embodiments described herein enable a distributed and efficient register structure enabling system providers to reduce cost and improve system performance while preventing malicious devices from accessing isolated memory regions. As computing systems increase in complexity, and thus increase in the number of endpoints and protected ranges, maintaining a huge number of registers becomes costly in terms of hardware and boot time latencies.

In embodiments described herein, isolated memory region access control registers are distributed through multiple access points or bridges. The isolated memory region access control registers may be stored in local memory at the access point, in system memory, in hardware registers at the access point/bridge, or the like. The isolated memory region access control registers at an access point may be optimized and minimized to allow fast and efficient access control. An access point needs access control information for each protected memory region. This information, typically stored in registers and accessed during system operation can become quite large (number of bits required per system=number of bits needed for access control information X number of isolated memory regions). According to various embodiments, this information is distributed amongst all access points and tailored to the specific devices connected to the access point. For a typical access point, isolated memory region access control registers are populated with address range information and device access permissions only for isolated memory regions that are accessible by devices connected to the access point. The access point deters against unauthorized access to all isolated memory regions, including devices that do not have access to a particular isolated memory region. Optimized isolated memory region access control registers are populated with address range information, but not with device access permissions for isolated memory regions not accessible by devices connected to the access point. Thus, each access point will have different configuration tables, but overall efficiencies are gained by having reduced storage requirements at each access point. According to some embodiments, a significant number of register bits can be eliminated allowing optimized register programming thus reducing system boot and wake up time impact.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" and "circuit" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 illustrates a computing system 100 according to various embodiments. System 100 may be any type of computing platform, ranging from small portable devices such as smartphones, tablet computers and so forth to larger devices such as client systems, for example, desktop and/or workstation systems, server systems and so forth. System 100 includes a memory access controller 102 and a memory management unit (MMU) 104. Memory access controller 102 and MMU 104 control memory accesses to memory 108 through a Network on a Chip (NoC) fabric 110. Memory 108 may be implemented as a shared virtual memory (SVM). In an embodiment, memory 108 and memory access controller 102 are coupled via at least one of NoC fabric 110, a memory fabric (not shown), and a memory bus (not shown). In an embodiment, memory access controller 102 and MMU 104 are components of a system on chip (SoC). In an embodiment, memory 108, memory access controller 102 and the MMU 104 are components of a system on chip (SoC). In an embodiment, system 100 may include one or more multi-chip systems in one or more packages.

One or more devices 112 and one or more devices 116 are configured to be communicatively coupled to the MMU 104. In an embodiment, the one or more of the devices 112 and 116 are coupled to the MMU 104. In an embodiment, one or more of the devices 112 and 116 are removably coupled to the MMU 104. In an embodiment one or more of the devices 112 are configured to be communicatively coupled to the MMU 104 via a SoC interface fabric 118. In an embodiment, one or more devices 116 are configured to be communicatively coupled to the MMU 104 via one or more trusted device translation look aside buffers (TLBs) 122. In an embodiment, some internal devices may operate using physical memory addresses and bypass IOMMU translations when communicating to the memory. In an embodiment, one or more of the devices 116 are configured to be coupled to the MMU 104. Examples of devices 112 and 116 include but are not limited to central processing units (CPUs), graphic processing units (GPUs), various peripheral component interconnect express (PCIe) devices, virtual machines (VMs), processes, a phase-locked loop (PLL) unit, an input/output (I/O) unit, an application specific integrated circuit (ASIC) unit, a field-programmable gate array unit (FPGA), a graphics card, a III-V unit, an accelerator, and a three-dimensional integrated circuit (3D IC). In an embodiment, one or more of the devices 116 are Compute Express Line (CXL) devices, that is, high-speed central processing unit (CPU)-to-device and CPU-memory connections, designed for high performance data center computing systems. Note that some devices 112 and 116 may include a processor complex which may include one or more cores or processing engines.

In an embodiment, the MMU 104 includes an input/output memory management unit (IOMMU) 120 and one or more trusted device (TLBs) 122. In alternative embodiments, two or more devices 116 may be communicatively coupled to a single trusted TLB (not shown). While a configuration of an embodiment of the MMU 104 has been described, in alternative embodiments, alternative configurations of the MMU 104 may be used.

In an embodiment, the memory access controller 102 includes one or more memory access control bridges 124 and 126. Memory access control bridges 124 and 126 may also be referred to as memory protection units (MPUs). In an embodiment, IOMMU 120 is communicatively coupled to a memory access control bridge 124. In an embodiment, each trusted device TLB 122 is communicatively coupled to an associated memory access control bridge 126. In an embodiment, IOMMU 120 and the one or more trusted device TLBs 122 are communicatively coupled to a single memory access control bridge (not shown). In an embodiment, two or more trusted device TLBs are communicatively coupled to a single memory access control bridge (not shown). While a number of configurations of the memory access controller 102 have been described, in alternative embodiments, alternative configurations of the memory access controller 102 may be used.

Memory 108 may have one or more isolated memory regions (IMRs) 132, 134, 136, and 138. MMU 104 and the memory access controller 102 cooperate to ensure that only legitimate memory transactions generated by devices 112 and 116 are allowed to access isolated memory regions 132, 134, 136, and 138. Although only four isolated memory regions are shown, a system may have less or more isolated memory regions.

In an embodiment, isolated memory regions 132, 134, 136, 138 are associated with and only accessible by certain devices. For example, the isolated memory region 132 may be associated with only one of devices 112 and 116. In other words, only memory transactions generated by the one of devices 112 and 116, that is, a device with the proper permissions, is allowed to access isolated memory region 132. In an embodiment, a single device may be associated with more than one isolated region. In an embodiment, multiple of devices may be associated with a single isolated memory region. MMU 104 and the memory access controller 102 cooperate to ensure that only memory transactions generated by specific devices 112 and/or 116 are allowed to access isolated memory regions 132 through 138 as specified by memory access control configurations.

Figure 8:
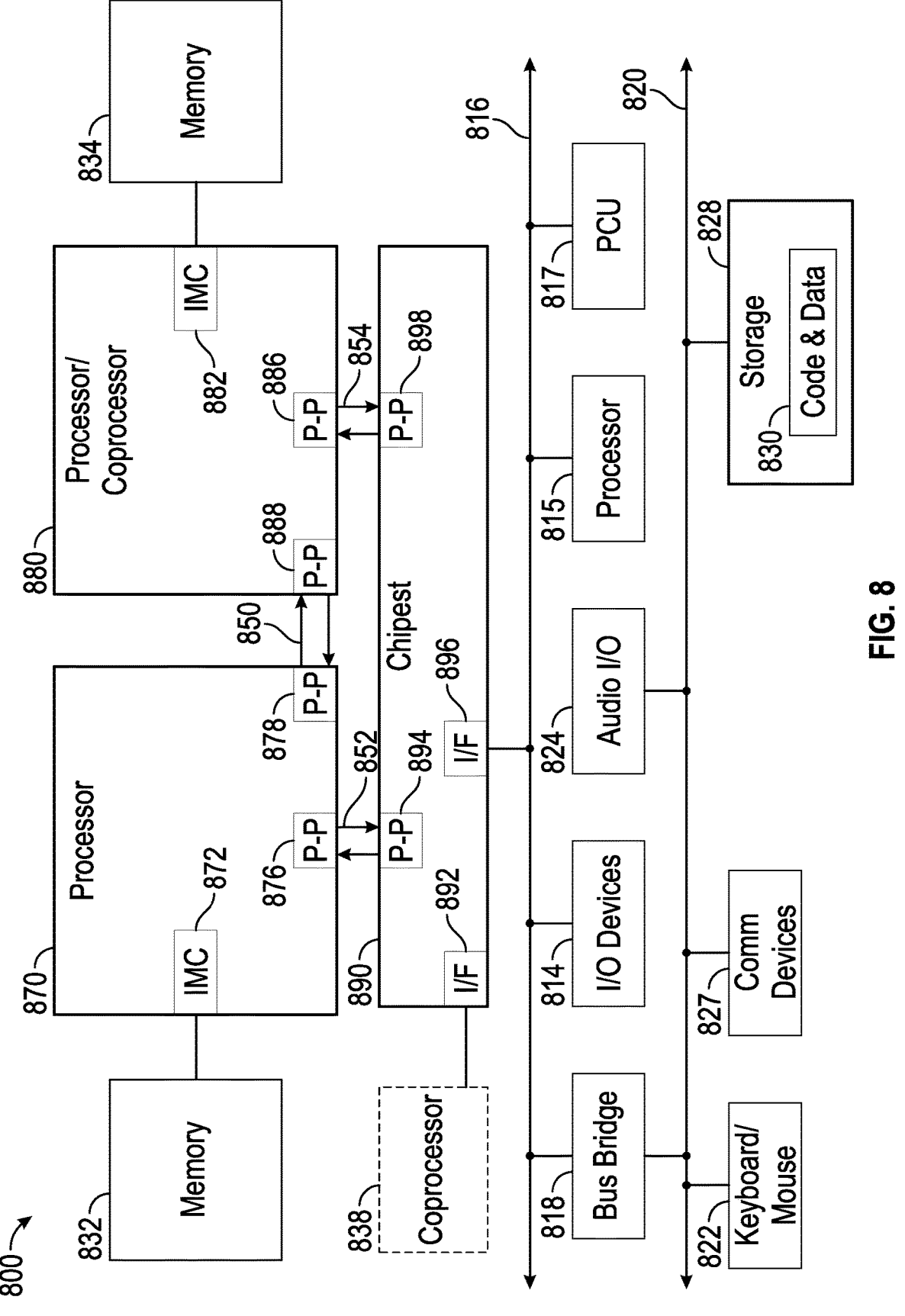
FIG. 8 illustrates a block diagram of a system in accordance with an embodiment.

While a configuration of system 100 has been described, alternative embodiments may have different configurations. While system 100 is described as including the components illustrated in FIG. 1, alternative embodiments may include additional components that facilitate the operation of system 100. Also refer to an alternate embodiment of a system configuration as shown in FIG. 8.

Figure 2:
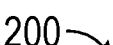
FIG. 2 illustrates a set of isolated memory region registers for providing access control to an isolated memory region according to various embodiments.
Figure 2:
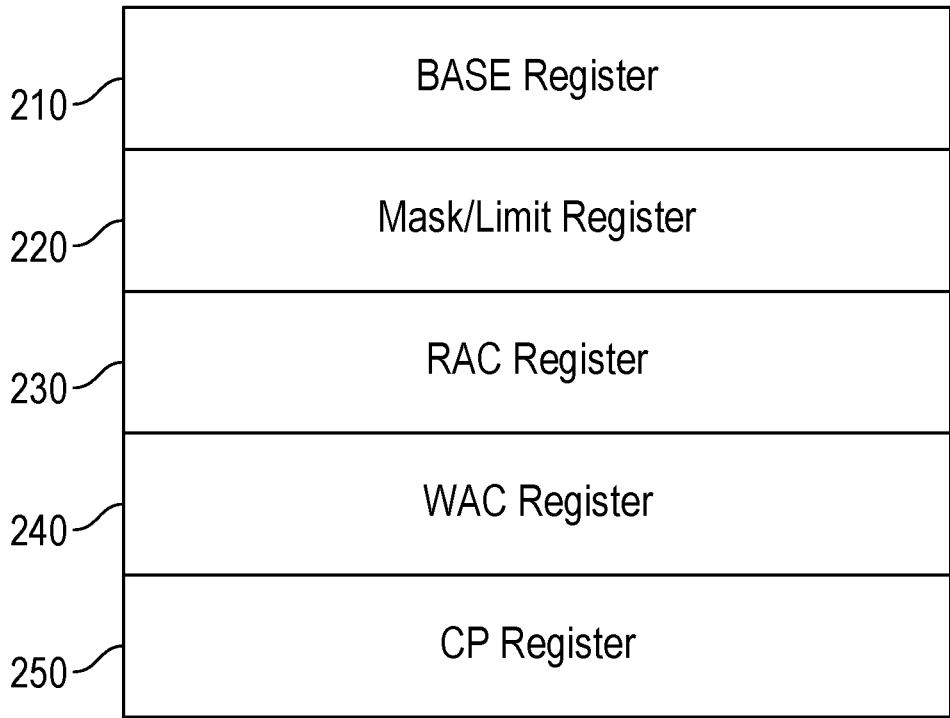

FIG. 2 illustrates a set of IMR registers 200 for providing access control to an isolated memory region according to various embodiments. An access point needs access control information for each protected memory region. According to various embodiments, this information is distributed amongst all access points and tailored to the specific devices connected to the access point. For a typical access point, isolated memory region access control registers including both address range information and device access permissions are populated only for isolated memory regions that are accessible by devices connected to the access point. Base Register 210 contains the address at the start of the protected range of memory. Mask/Limit register 220 contains the address at the end of the protected range of memory. In one embodiment Mask/Limit register 220 uses a mask and limit format. Read access control (RAC) register 230 contains the read access permission list. Write access control (WAC) register 240 contains the write access permission list. Change permission (CP) register 250 contains the permissions change access control information. In short, registers 210-220 define the memory address range and registers 230-250 define which devices can access and how they can access the isolated memory region.

Registers 200 provide access control information to allow a device to access a protected range of memory. Each register may be 64 bits wide according to some embodiments. One set of registers 200 is needed for each protected memory range at every device endpoint. As such, registers 200 are provided in access points where devices have access to read/write/modify the protected ranges.

Figure 3:
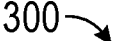
FIG. 3 illustrates a set of isolated memory region registers for providing optimized access control to an isolated memory region according to various embodiments.
Figure 3:
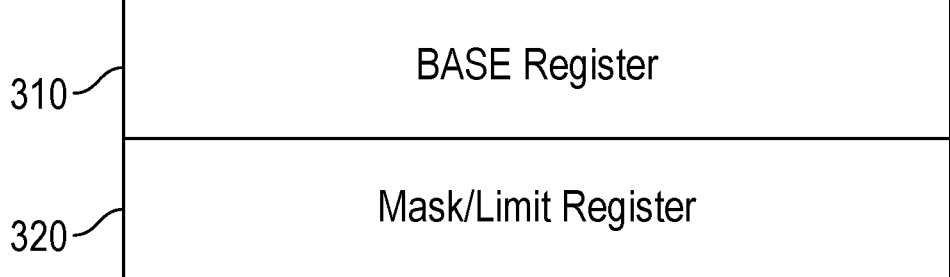

FIG. 3 illustrates a set of IMR registers 300 for providing optimized access control for an isolated memory region according to various embodiments. An access point must deter unauthorized access to all isolated memory regions, including from devices that do not have permission to access a particular isolated memory region. Optimized isolated memory region access control registers are populated for isolated memory regions not accessible by devices connected to the access point. Registers 300 only provide address range information, for example, using a Base Register 310 and Mask/Limit Register 320. Thus, any access to the isolated memory region is blocked through the particular endpoint such that any transaction that attempts to access an isolated memory region is rejected without any additional access checks. A register set such as register set 200 that includes device access permissions may be used for isolated memory regions if the device(s) that require access to a relevant isolated region are communicatively coupled to that specific access point. In some access points, an optimized register set 300 may be implemented in order to protect the region from illegal accesses. Optimized register set 300 reduces latency since only address range checks are performed.

In some embodiments, registers sets 200 and 300 may be referred to as "complete" and "optimized," respectively. Herein, "complete" refers to including both address range information and device access permissions while "optimized" refers to having address range information but not device access permissions. Alternate embodiments may include additional information stored in the registers and/or may have different configurations to define address range information and/or device access permissions. For example, address range information may not follow a Mask/Limit format and instead include starting and ending addresses or the like.

In an embodiment, multiple sets of registers 200 and registers 300 may be stored in a memory access table at an access point, one set for each isolated memory region in memory. These registers may be also referred to as entries or table entries and may be stored in local memory at the access point/bridge, in system memory, in hardware registers at the access point/bridge, volatile or non-volatile memory, or the like. The memory access table may also be referred to as a NoC bridge table, memory access control table and the like.

Figure 4:
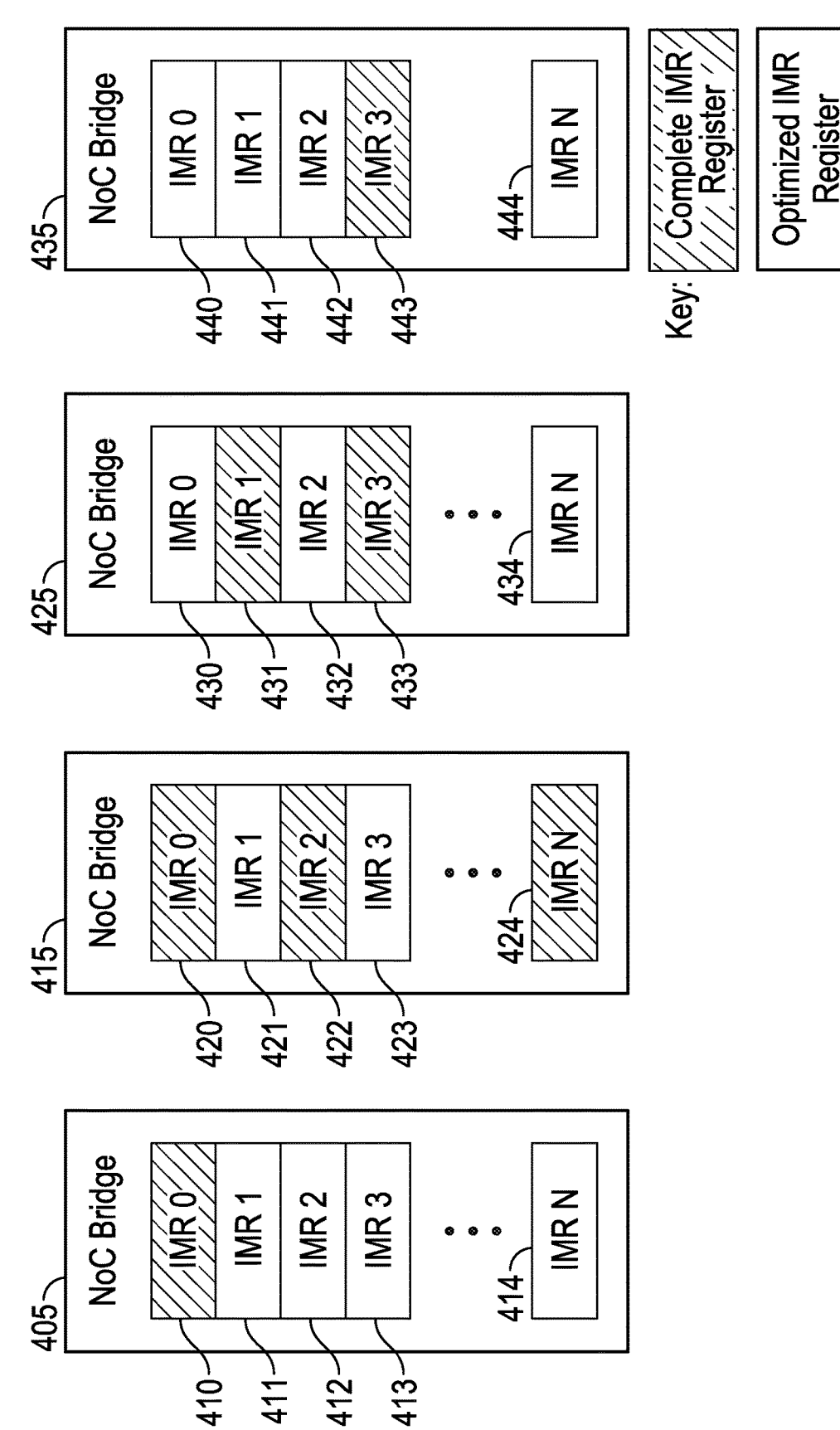
FIG. 4 illustrates multiple sets of network-on-a-chip (NoC) bridge tables according to various embodiments.

FIG. 4 illustrates a set of NoC Bridge tables 400 according to various embodiments. As illustrated, each of NoC bridges 405, 415, 425 and 435 have sets of registers, one set for each isolated memory region, but includes optimizations according to the specific devices connected to the NoC Bridge. For example, NoC bridge 405 only has a complete IMR register set for IMR 0 410 and optimized IMR registers for the other isolated memory regions. Likewise, NoC Bridge 415 only has complete sets of registers for IMR 0 420, IMR 2 422 and IMRN 424; NoC Bridge 425 only has complete sets of registers for IMR1 431 and IMR3 433; NoC Bridge 435 only has complete sets of registers for IMR3 433; all other IMR registers contain optimized IMR register sets.

According to some embodiments, in an access point/NoC Bridge, only complete IMR register sets are used for some isolated memory regions, while optimized IMR register sets are used for other isolated memory regions. As illustrated, only IMR0 410 in NoC Bridge 405 has a complete IMR register set while IMR 1 411, IMR 2 412, IMR 3 413 and IMR N 414 have optimized IMR register sets. Thus, NoC Bridge 405 is coupled to one or more devices that can access isolated memory range 0, but no devices coupled that have access to isolated memory ranges 1-N. Further, one or more devices coupled to NoC Bridge 415 have access to isolated memory range 0 (as shown by a complete IMR 0 420 register set). Thus, according to some embodiments, multiple devices across multiple NoC bridge may have access to a single isolated memory range.

Note that although the tables illustrated in FIG. 4 are labelled NoC Bridge tables 405, 415, 425, and 435, the location of the tables may be implementation specific. Referring to FIG. 1, the NoC Bridge tables may be located in or coupled to Memory Access Controller 102 or Memory Management unit 104 or an alternate location according to specific system implementations.

Figure 5:
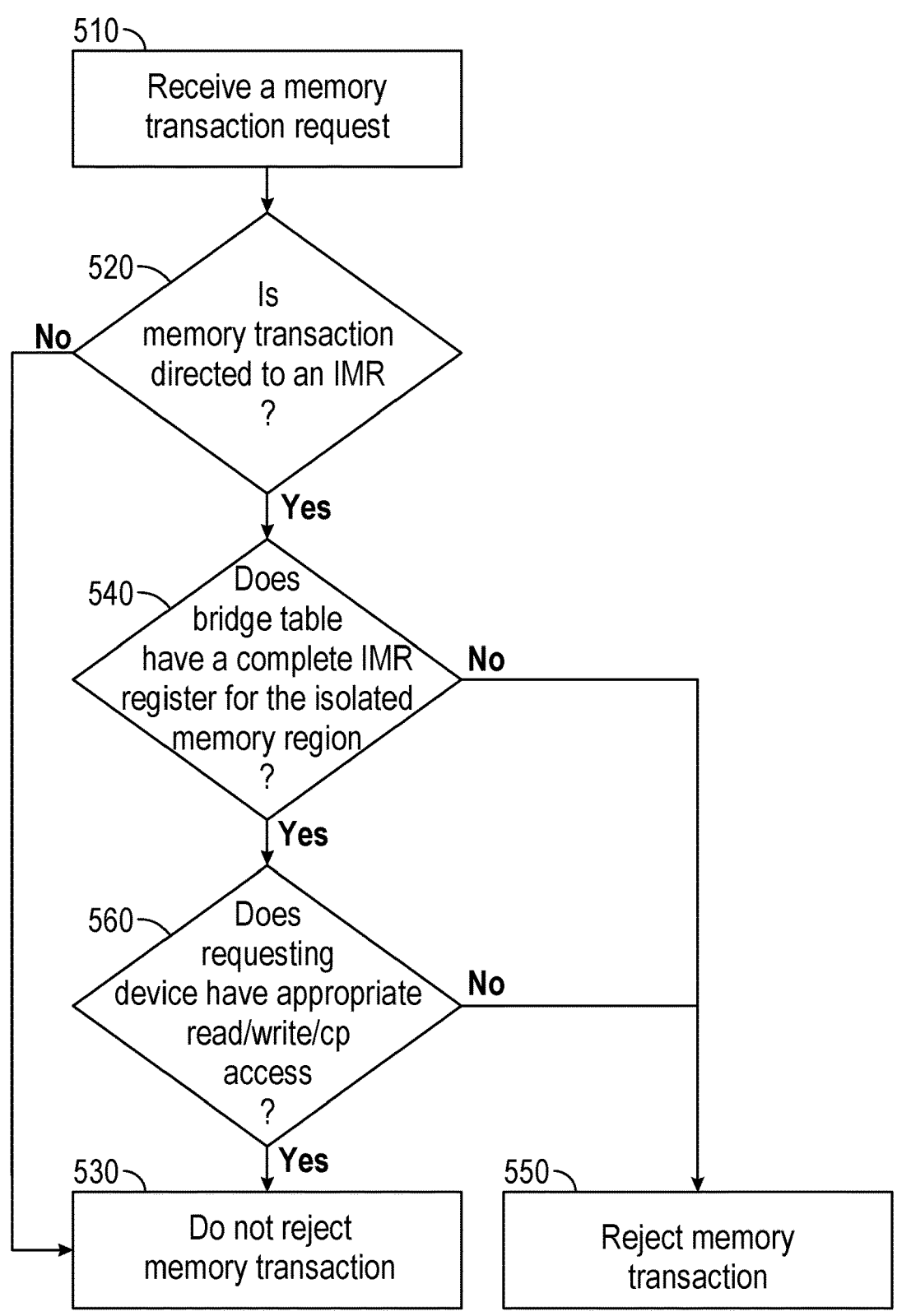
FIG. 5 illustrates a flow diagram for processing a received memory transaction according to various embodiments.

FIG. 5 illustrates a flow diagram 500 for processing a received memory transaction according to some embodiments. In some embodiments, flow diagram 500 may performed fully or in part by hardware circuits in a memory access controller 102 and/or memory management unit 104 of system 100 of FIG. 1. In another embodiment, memory management software may perform some or all of the operations illustrated. Flow diagram 500 begins with the receipt of a memory transaction request, block 510. The memory transaction request may be, for example, a read memory or write memory transaction from/to a specific location in memory by a device. The memory transaction request is evaluated to determine if the memory transaction seeks to access an isolated memory region (IMR), block 520. This evaluation includes checking the entries in a local NoC bridge table. If the memory transaction does not seek to access a protected memory region, the memory transaction request is not rejected based on this evaluation, block 530. Note there are other reasons that the memory transaction request may be rejected. If the memory transaction seeks to access an isolated memory region the local NoC bridge table is evaluated to determine if a complete set of registers is provided for the isolated memory region, block 540. If only an optimized set of registers is provided for the isolated memory range, the memory transaction request is rejected, block 550. If the bridge registers have a complete register set for the isolated memory range, the registers are checked to see if the device has permissions authorizing the memory transaction, block 560. If not, the memory transaction request is rejected, block 550. If the device does have the permissions authorizing the memory transaction, the memory transaction request is not rejected based on this evaluation, block 530. Note there are other reasons that the memory transaction request may be rejected.

Figure 6:
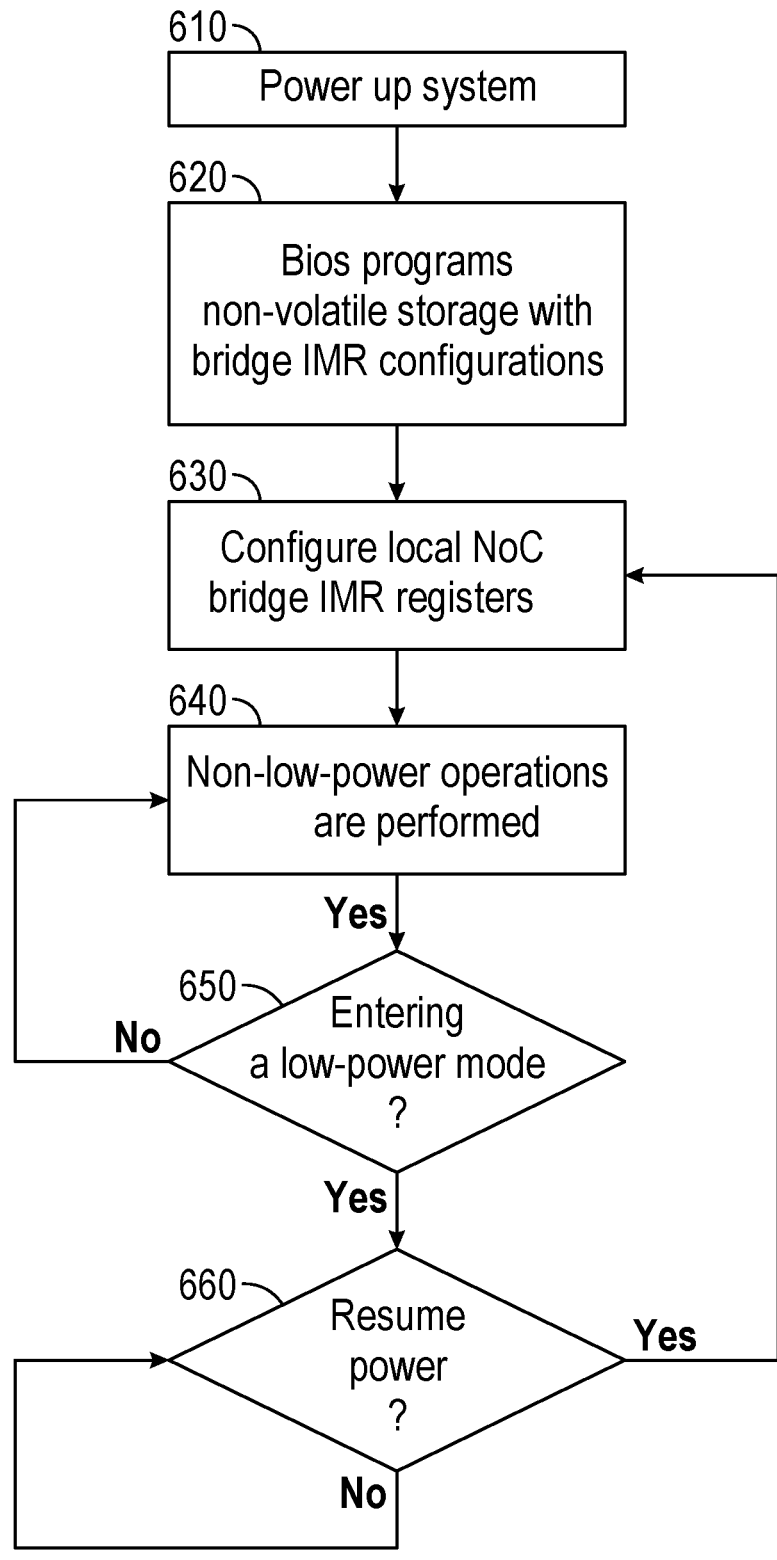
FIG. 6 illustrates a flow diagram showing a process for power savings when entering and exiting a low power mode according to various embodiments.

FIG. 6 illustrates a flow diagram showing process for power savings when entering and exiting a low power mode according to various embodiments. Flow diagram 600 begins at system power up, block 610. Basic input/output system (BIOS) and/or other startup system software services program non-volatile storage with bridge IMR configurations, for example, including complete and optimized registers sets for each IMR and tailored for each NoC bridge, such as tables 400 as illustrated in FIG. 4 at block 620. Alternatively, non-volatile storage might be programmed with one set of complete registers for each isolated memory region, requiring the tailored sets be configured in the next step at block 630. The bridge IMR registers are copied from the non-volatile memory directly or, alternatively tailored for each bridge, and written to the bridge tables at block 630. For example, referring to FIG. 4, NoC Bridge 0 Registers 410-414 are copied locally to NoC Bridge 0, NoC Bridge 1 Registers 420-424 are copied locally to NoC Bridge 1, and so forth. Alternatively, upon reading a complete set of IMR registers for each isolated memory region, complete and optimized registers are generated and stored in the bridge IMR tables. Non-low power system operations are performed, block 640, until the system enters a low power state, block 650. In some embodiments, registers stored at each bridge in volatile memory are not retained. The bridge IMR configurations stored in non-volatile memory are typically retained, thus saving programming time when the system resumes a non-low power state, block 660 returning to block 630 and the configuration of the bridge IMR registers in volatile memory.

Figure 7:
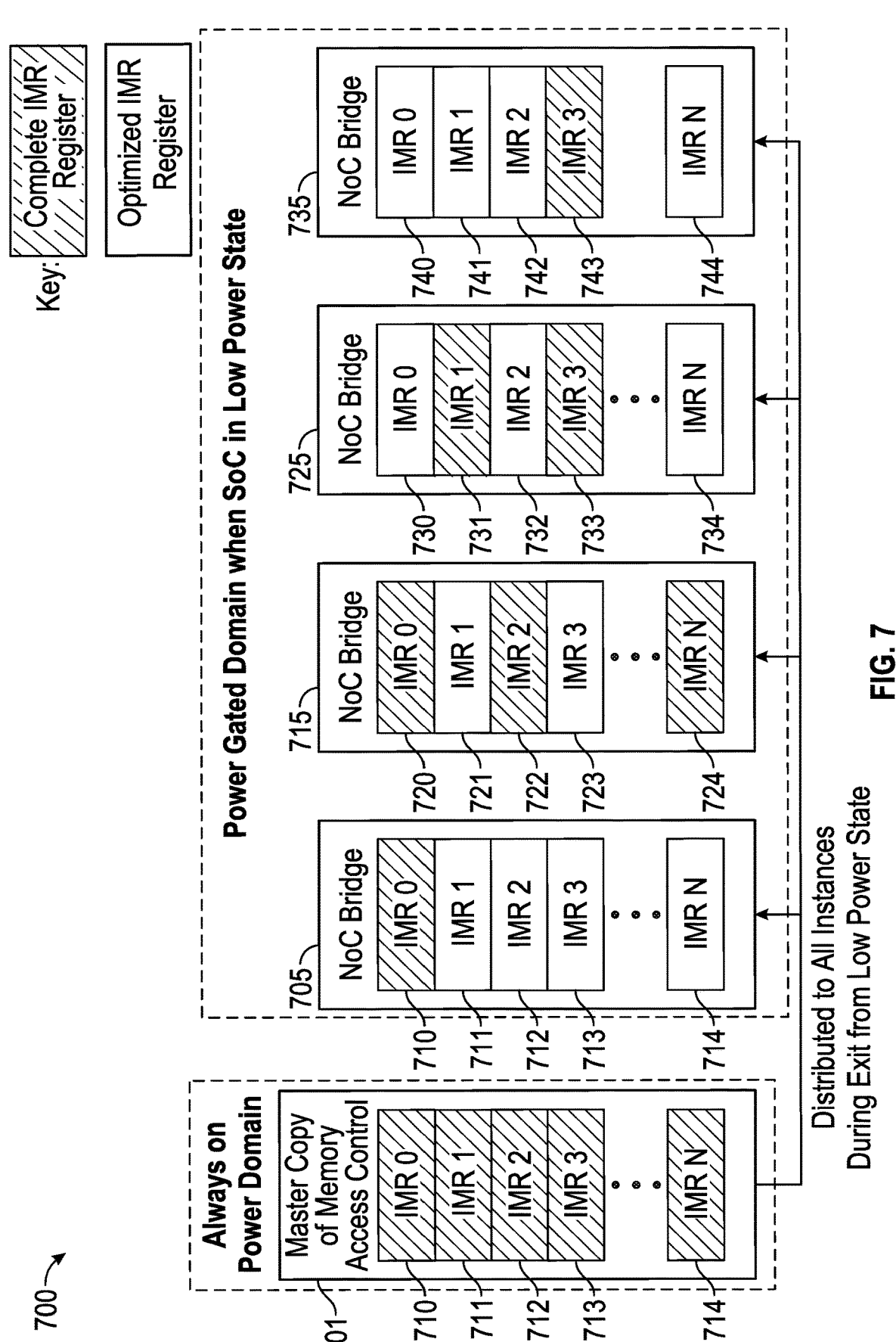
FIG. 7 illustrates a configuration of local NoC bridge IMR registers according to an embodiment.

FIG. 7 illustrates the configuration of local NoC bridge IMR registers according to an embodiment. As illustrated, each of NoC bridges 705, 715, 725 and 735 have sets of registers, one set for each isolated memory region, but includes optimizations according to the specific devices connected to the NoC Bridge similar to FIG. 4. As illustrated, NoC bridges 705, 715, 725 and 735 are located in domain(s) that are typically powered down in low power states, effectively erasing existing configurations. A master copy of memory access control 701 is located in a domain that remains powered during a low power state. As illustrated, the master copy of memory access control 701 contains complete IMR registers for all isolated memory regions IMR 0-N. Upon exiting a low power state, the master copy of memory access control 701 is distributed to all instances of NoC Bridges, here NoC Bridges 705, 715, 725 and 735. In the distribution process, the IMR register sets are tailored to each bridge, for example NoC Bridge 705 only has a complete register set for isolated memory region 0, illustrated as IMR 0 710, while having optimized register sets for isolated memory regions 1-N, illustrated as IMR 1 711, IMR 2 712, IMR 3 713, and IMR N 714. Similarly, NoC Bridge 715 only has complete register sets for isolated memory regions 0, 2 and N, illustrated as IMR 0 720, IMR 2 722 and IMR N 724, while having optimized register sets for isolated memory regions 1 and 3, illustrated as IMR 1 721 and IMR 3 723. Similarly, NoC Bridge 256 has complete register sets for isolated memory regions 1 and 3, illustrated as IMR 1 731 and IMR3 733, while having optimized register sets for isolated memory regions 0, 2 and N, illustrated as IMR 0 730, IMR 2 732 and IMR N 734. Similarly, Noc Bridge 735 has a complete register set for isolated memory region 3, illustrated as IMR 3 743, while having optimized register sets for isolated memory regions 0, 1, 2 and N, illustrated as IMR 0 740, IMR 1 741, IMR 2 742, and IMR N 744. As such, power and space savings may be achieved using a mix of complete and optimized IMR registers.

Detailed below are examples of computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

FIG. 8 illustrates a block diagram of a system in accordance with an embodiment. Multiprocessor system 800 is a point-to-point interconnect system and includes a plurality of processors including a first processor 870 and a second processor 880 coupled via a point-to-point interconnect 850. In some examples, the first processor 870 and the second processor 880 are homogeneous. In some examples, first processor 870 and the second processor 880 are heterogenous. Though the system 800 is shown to have two processors, the system may have three or more processors, or may be a single processor system.

Processors 870 and 880 are shown including integrated memory controller (IMC) circuitry 872 and 882, respectively. Processor 870 also includes as part of its interconnect controller point-to-point (P-P) interfaces 876 and 878; similarly, second processor 880 includes P-P interfaces 886 and

888. Processors 870, 880 may exchange information via the point-to-point (P-P) interconnect 850 using P-P interface circuits 878, 888. IMCs 872 and 882 couple the processors 870, 880 to respective memories, namely a memory 832 and a memory 834, which may be portions of main memory locally attached to the respective processors.

Processors 870, 880 may each exchange information with a chipset 890 via individual P-P interconnects 852, 854 using point to point interface circuits 876, 894, 886, 898. Chipset 890 may optionally exchange information with a coprocessor 838 via an interface 892. In some examples, the coprocessor 838 is a special-purpose processor, such as, for example, a high-throughput processor, a network or communication processor, compression engine, graphics processor, general purpose graphics processing unit (GPU), neural-network processing unit (NPU), embedded processor, or the like.

A shared cache (not shown) may be included in either processor 870, 880 or outside of both processors, yet connected with the processors via P-P interconnect, such that either or both processors' local cache information may be stored in the shared cache if a processor is placed into a low power mode.

Chipset 890 may be coupled to a first interconnect 816 via an interface 896. In some examples, first interconnect 816 may be a Peripheral Component Interconnect (PCI) interconnect, or an interconnect such as a PCI Express interconnect or another I/O interconnect. In some examples, one of the interconnects couples to a power control unit (PCU) 817, which may include circuitry, software, and/or firmware to perform power management operations with regard to the processors 870, 880 and/or co-processor 838. PCU 817 provides control information to a voltage regulator (not shown) to cause the voltage regulator to generate the appropriate regulated voltage. PCU 817 also provides control information to control the operating voltage generated. In various examples, PCU 817 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 817 is illustrated as being present as logic separate from the processor 870 and/or processor 880. In other cases, PCU 817 may execute on a given one or more of cores (not shown) of processor 870 or 880. In some cases, PCU 817 may be implemented as a microcontroller (dedicated or general-purpose) or other control logic configured to execute its own dedicated power management code, sometimes referred to as P-code. In yet other examples, power management operations to be performed by PCU 817 may be implemented externally to a processor, such as by way of a separate power management integrated circuit (PMIC) or another component external to the processor. In yet other examples, power management operations to be performed by PCU 817 may be implemented within BIOS or other system software.

Various I/O devices 814 may be coupled to first interconnect 816, along with a bus bridge 818 which couples first interconnect 816 to a second interconnect 820. In some examples, one or more additional processor(s) 815, such as coprocessors, high-throughput many integrated core (MIC) processors, GPGPUs, accelerators (such as graphics accelerators or digital signal processing (DSP) units), field programmable gate arrays (FPGAs), or any other processor, are coupled to first interconnect 816. In some examples, second interconnect 820 may be a low pin count (LPC) interconnect. Various devices may be coupled to second interconnect 820 including, for example, a keyboard and/or mouse 822, communication devices 827 and a storage circuitry 828. Storage circuitry 828 may be one or more non-transitory machine-readable storage media as described below, such as a disk drive or other mass storage device which may include instructions/code and data 830. Further, an audio I/O 824 may be coupled to second interconnect 820. Note that other architectures than the point-to-point architecture described above are possible. For example, instead of the point-to-point architecture, a system such as multiprocessor system 800 may implement a multi-drop interconnect or other such architecture.

According to some embodiments, all or portions of memory access controller 102 and memory management unit 104 of FIG. 1 may be located within integrated memory controller 872 and/or 882. Alternatively, all or portions of memory access controller 102 and memory management unit 104 of FIG. 1 may be located within chipset 890. In some embodiments, some or all of operations performed by memory access controller 102 and memory management unit 104 of FIG. 1 are performed by memory management software services.

Examples of Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may include on the same die as the described CPU (sometimes referred to as the application core(s) or application processor(s)), the above described coprocessor, and additional functionality. Examples of core architectures are described next, followed by descriptions of examples of processors and computer architectures.

Figure 9:
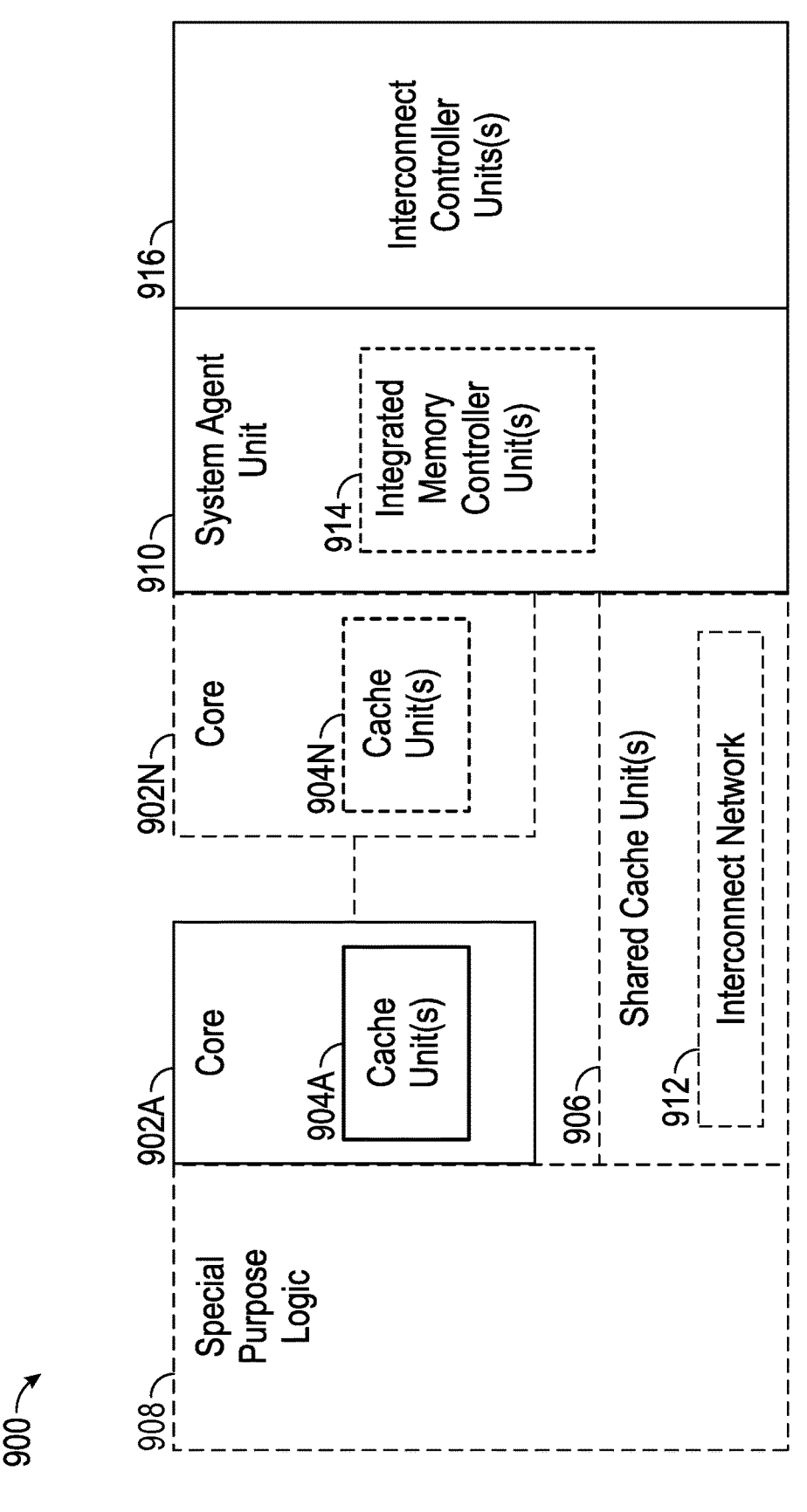
FIG. 9 illustrates a block diagram of an example processor that may have more than one core and an integrated memory controller according to various embodiments.

FIG. 9 illustrates a block diagram of an example processor 900 that may have more than one core and an integrated memory controller. The solid lined boxes illustrate a processor 900 with a single core 902A, a system agent unit circuitry 910, a set of one or more interconnect controller unit(s) circuitry 916, while the optional addition of the dashed lined boxes illustrates an alternative processor 900 with multiple cores 902(A)-(N), a set of one or more integrated memory controller unit(s) circuitry 914 in the system agent unit circuitry 910, and special purpose logic 908, as well as a set of one or more interconnect controller units circuitry 916. Note that the processor 900 may be one of the processors 870 or 880, or co-processor 838 or 815 of FIG. 8.

Thus, different implementations of the processor 900 may include: 1) a CPU with the special purpose logic 908 being integrated graphics and/or scientific (throughput) logic (which may include one or more cores, not shown), and the cores 902(A)-(N) being one or more general purpose cores (e.g., general purpose in-order cores, general purpose out-of-order cores, or a combination of the two); 2) a coprocessor with the cores 902(A)-(N) being a large number of special purpose cores intended primarily for graphics and/or scientific (throughput); and 3) a coprocessor with the cores 902(A)-(N) being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 904(A)-(N) within the cores 902(A)-(N), a set of one or more shared cache unit(s) circuitry 906, and external memory (not shown) coupled to the set of integrated memory controller unit(s) circuitry 914. The set of one or more shared cache unit(s) circuitry 906 may include one or more mid-level caches, such as level 2 (L2), level 3 (L3), level 4 (L4), or other levels of cache, such as a last level cache (LLC), and/or combinations thereof. While in some examples ring-based interconnect network circuitry 912 interconnects the special purpose logic 908 (e.g., integrated graphics logic), the set of shared cache unit(s) circuitry 906, and the system agent unit circuitry 910, alternative examples use any number of well-known techniques for interconnecting such units. In some examples, coherency is maintained between one or more of the shared cache unit(s) circuitry 906 and cores 902(A)-(N).

In some examples, one or more of the cores 902(A)-(N) are capable of multi-threading. The system agent unit circuitry 910 includes those components coordinating and operating cores 902(A)-(N). The system agent unit circuitry 910 may include, for example, power control unit (PCU) circuitry and/or display unit circuitry (not shown). The PCU may be or may include logic and components needed for regulating the power state of the cores 902(A)-(N) and/or the special purpose logic 908 (e.g., integrated graphics logic). The display unit circuitry is for driving one or more externally connected displays.

The cores 902(A)-(N) may be homogenous in terms of instruction set architecture (ISA). Alternatively, the cores 902(A)-(N) may be heterogeneous in terms of ISA; that is, a subset of the cores 902(A)-(N) may be capable of executing an ISA, while other cores may be capable of executing only a subset of that ISA or another ISA.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or to limit embodiments to the precise forms disclosed. While specific embodiments are described herein for illustrative purposes, various equivalent modifications are possible within the scope of the embodiments, as those skilled in the relevant art will recognize.

These modifications may be made to the embodiments in light of the above detailed description. The terms used in the following claims should not be construed to limit the embodiments to the specific implementations disclosed in the specification and the claims. Rather, the scope of the invention is to be determined entirely by the following claims, which are to be construed in accordance with established doctrines of claim interpretation.

Examples

The following examples pertain to further embodiments.

A first example may be a system comprising a memory; and a memory access control unit coupled to the memory, wherein the memory access control unit is to control access of a device to the memory; wherein the memory access control unit is to access a memory access bridge table, the memory access bridge table having a first set of access information entries associated with a first isolated memory region and a second set of access information entries associated with a second isolated memory region; and wherein the second set of access information entries contains less information than the first set of access information entries.

In another example the first set of access information entries include memory address range information for the first isolated memory region and device access information for the first isolated memory region.

In another example, the device access information for the first isolated memory region comprises read access control information, write access control information, and permission change access control information.

In another example, the memory address range information for the first isolated memory region includes a base register and a mask/limit register.

In another example, in any of the examples herein, the memory access bridge table is stored in a volatile memory.

In another example, the first set of access information entries and the second set of access information entries are copied to the memory access bridge table stored in the volatile memory from non-volatile memory upon system boot and upon exiting a low power mode.

In another example, the second set of access information entries include memory address range information for the second isolated memory region, and wherein the second set of access information entries does not include device access information for the second isolated memory region.

In another example, an apparatus includes a memory access control unit to control access of a device to a memory, wherein the memory access control unit is to access a memory access bridge table, the memory access bridge table having a first set of access information entries associated with a first isolated memory region and a second set of access information entries associated with a second isolated memory region; and wherein the second set of access information entries contains less information than the first set of access information entries; and circuitry to receive a memory transaction request from a device and to control access to the first isolated memory region and the second isolated memory region according to the first and second sets of access information entries in the memory access bridge table.

In another example, the first set of access information entries include memory address range information for the first isolated memory region and device access information for the first isolated memory region.

In another example, the device access information for the first isolated memory region comprises read access control information, write access control information, and permission change access control information.

In another example, the memory address range information for the first isolated memory region comprises a base register and a mask/limit register.

In another example, the memory access bridge table is stored in a volatile memory.

In another example, the first set of access information entries and the second set of access information entries are copied to the memory access bridge table stored in the volatile memory from non-volatile memory upon system boot and upon exiting a low power mode.

In another example, the second set of access information entries include memory address range information for the second isolated memory region, and wherein the second set of access information entries does not include device access information for the second isolated memory region.

In another example, a method comprises receiving a memory transaction request from a device; determining if the memory transaction request is directed to an isolated memory region of a memory and if the device has permission to access the isolated memory region, the determining including accessing a memory access table; the memory access table comprising: a first set of access information entries associated with a first isolated memory region and a second set of access information entries associated with a second isolated memory region; wherein the second set of access information entries contains less information than the first set of access information entries; and rejecting the memory transaction request if the device does not have permissions to access the isolated memory region.

In another example, the first set of access information entries include memory address range information for the first isolated memory region and device access information for the first isolated memory region.

In another example, the device access information for the first isolated memory region comprises read access control information, write access control information, and permission change access control information.

In another example, the second set of access information entries include memory address range information for the second isolated memory region, and wherein the second set of access information entries does not include device access information for the second isolated memory region.

In another example, the method further comprising configuring the memory access table including copying the contents of the memory access table from a non-volatile memory.

In another example, the configuring occurs during system boot.

In another example, a computer-readable storage medium including computer-readable instructions, when executed, to implement a method as claimed in any of the examples herein.

In another example, an apparatus comprising means to perform a method in any of the examples herein.

In another example, an apparatus comprising means for receiving a memory transaction request from a device; means for determining if the memory transaction request is directed to an isolated memory region of a memory and if the device has permission to access the isolated memory region, the means for determining including means for accessing a memory access table; the memory access table comprising: a first set of access information entries associated with a first isolated memory region and a second set of access information entries associated with a second isolated memory region; wherein the second set of access information entries contains less information than the first set of access information entries; and means for rejecting the memory transaction request if the device does not have permissions to access the isolated memory region.

In another example, the first set of access information entries include memory address range information for the first isolated memory region and device access information for the first isolated memory region.

In another example, the device access information for the first isolated memory region comprises read access control information, write access control information, and permission change access control information.

In another example, the second set of access information entries include memory address range information for the second isolated memory region, and wherein the second set of access information entries does not include device access information for the second isolated memory region.

In another example, the apparatus further comprising means for configuring the memory access table including means for copying the contents of the memory access table from a non-volatile memory.

In another example, the means for configuring occurs during system boot.

Another example may include an apparatus comprising means to perform one or more elements of a method described in or related to any of examples herein, or any other method or process described herein.

Another example may include one or more non-transitory computer-readable media comprising instructions to cause an electronic device, upon execution of the instructions by one or more processors of the electronic device, to perform one or more elements of a method described in or related to any of examples herein, or any other method or process described herein.

Another example may include an apparatus comprising logic, modules, or circuitry to perform one or more elements of a method described in or related to any of examples herein, or any other method or process described herein.

Another example may include a method, technique, or process as described in or related to any of examples herein, or portions or parts thereof.

Another example may include an apparatus comprising: one or more processors and one or more computer readable media comprising instructions that, when executed by the one or more processors, cause the one or more processors to perform the method, techniques, or process as described in or related to any of examples herein, or portions thereof.

Another example may include a signal as described in or related to any of examples herein, or portions or parts thereof.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A system comprising:
a memory; and
a memory access control unit coupled to the memory, wherein the memory access control unit is to control access of a device to the memory, wherein the memory access control unit is to access a memory access bridge table associated with an endpoint to which the device is coupled, the memory access bridge table having a first set of access information entries associated with a first isolated memory region of the memory and a second set of access information entries associated with a second isolated memory region of the memory, wherein the second set of access information entries contains less information than the first set of access information entries, wherein the first set of access information entries comprises memory address range information and device access information associated with the first isolated memory region of the memory and the second set of access information entries comprises memory address range information associated with the second isolated memory region and does not include device access information associated with the second isolated memory region, and wherein a transaction from the device directed to the first isolated memory region is authorized when the first set of access information entries indicates that the device is authorized, and wherein all transactions from the device directed to the second isolated memory are rejected.

2. The system of claim 1, wherein the device access information for the first isolated memory region comprises read access control information, write access control information, and permission change access control information.

3. The system of claim 1, wherein the memory address range information for the first isolated memory region includes a base register and a mask/limit register.

4. The system of claim 1, wherein the memory access bridge table is stored in a volatile memory.

5. The system of claim 4, wherein the first set of access information entries and the second set of access information entries are copied to the memory access bridge table stored in the volatile memory from non-volatile memory upon system boot and upon exiting a low power mode.

6. The system of claim 1, wherein the endpoint is one of a plurality of endpoints, and wherein each of the plurality of endpoints is associated with a respective memory access bridge table.

7. The system of claim 6, wherein each of the respective memory access bridge tables comprises the first and second sets of access information entries.

8. An apparatus comprising:
a memory access control unit to control access of a device to a memory, wherein the memory access control unit is to access a memory access bridge table associated with an endpoint to which the device is coupled, the memory access bridge table having a first set of access information entries associated with a first isolated memory region of the memory and a second set of access information entries associated with a second isolated memory region of the memory, wherein the second set of access information entries contains less information than the first set of access information entries, wherein the first set of access information entries comprises memory address range information and device access information associated with the first isolated memory region of the memory and the second set of access information entries comprises memory address range information associated with the second isolated memory region and does not include device access information associated with the second isolated memory region, and wherein a transaction from the device directed to the first isolated memory region is authorized when the first set of access information entries indicates that the device is authorized, and wherein all transactions from the device directed to the second isolated memory are rejected; and
circuitry to receive a memory transaction request from a device and to control access to the first isolated memory region and the second isolated memory region according to the first and second sets of access information entries in the memory access bridge table.

9. The apparatus of claim 8, wherein the device access information for the first isolated memory region comprises read access control information, write access control information, and permission change access control information.

10. The apparatus of claim 8, wherein the memory address range information for the first isolated memory region comprises a base register and a mask/limit register.

11. The apparatus of claim 8, wherein the memory access bridge table is stored in a volatile memory.

12. The apparatus of claim 11, wherein the first set of access information entries and the second set of access information entries are copied to the memory access bridge table stored in the volatile memory from non-volatile memory upon system boot and upon exiting a low power mode.

13. The apparatus of claim 8, wherein the endpoint is one of a plurality of endpoints, and wherein each of the plurality of endpoints is associated with a respective memory access bridge table.

14. The apparatus of claim 13, wherein each of the respective memory access bridge tables comprises the first and second sets of access information entries.

15. A method comprising:

receiving a memory transaction request from a device;

determining if the memory transaction request is directed to an isolated memory region of a memory and if the device has permission to access the isolated memory region, the determining including accessing a memory access table associated with an endpoint to which the device is coupled, the memory access table comprising:

a first set of access information entries associated with a first isolated memory region of the memory and a second set of access information entries associated with a second isolated memory region of the memory, wherein the second set of access information entries contains less information than the first set of access information entries, wherein the first set of access information entries comprises memory address range information and device access information associated with the first isolated memory region of the memory and the second set of access information entries comprises memory address range information associated with the second isolated memory region and does not include device access information associated with the second isolated memory region, and wherein a transaction from the device directed to the first isolated memory region is authorized when the first set of access information entries indicates that the device is authorized, and wherein all transactions from the device directed to the second isolated memory are rejected; and rejecting the memory transaction request if the device is not authorized to access the isolated memory region.

16. The method of claim 15, wherein the device access information for the first isolated memory region comprises read access control information, write access control information, and permission change access control information.

17. The method of claim 15, further comprising configuring the memory access table including copying contents of the memory access table from a non-volatile memory.

18. The method of claim 17, wherein the configuring occurs during system boot.

19. The method of claim 15, wherein the endpoint is one of a plurality of endpoints, and wherein each of the plurality of endpoints is associated with a respective memory access table.

20. The method of claim 19, wherein each of the respective memory access tables comprises the first and second sets of access information entries.

* * * * *